(12) United States Patent
Gomez Nebot

(10) Patent No.: US 10,441,072 B2
(45) Date of Patent: Oct. 15, 2019

(54) MOBILE STRUCTURE FOR WORKING WITH COMPUTER EQUIPMENT COUPLABLE TO SLANTING CHAIRS

(71) Applicant: Aparicio Gomez Nebot, Barcelona (ES)

(72) Inventor: Aparicio Gomez Nebot, Barcelona (ES)

( * ) Notice: Subject to any disclaimer, the term of this patent is extended or adjusted under 35 U.S.C. 154(b) by 84 days.

(21) Appl. No.: 15/663,020

(22) Filed: Jul. 28, 2017

(65) Prior Publication Data
US 2018/0049544 A1    Feb. 22, 2018

(30) Foreign Application Priority Data

Aug. 18, 2016   (ES) ............................... 201600590 U
Sep. 7, 2016    (ES) .................................. 201631099

(51) Int. Cl.
| | |
|---|---|
| *A47C 7/70* | (2006.01) |
| *A47B 21/04* | (2006.01) |
| *A47B 23/02* | (2006.01) |
| *A47B 41/02* | (2006.01) |
| *A47B 39/00* | (2006.01) |
| *A47B 83/02* | (2006.01) |

(Continued)

(52) U.S. Cl.
CPC .............. *A47B 21/04* (2013.01); *A47B 23/02* (2013.01); *A47B 41/02* (2013.01); *A47C 7/70* (2013.01); *A47C 7/72* (2013.01); *A47B 21/03* (2013.01); *A47B 83/02* (2013.01); *A47B 2200/0072* (2013.01); *F16M 11/10* (2013.01)

(58) Field of Classification Search
CPC ..... A47B 21/03; A47B 21/04; A47B 21/0314; A47B 23/02; A47B 41/02; A47B 2200/0072; A47C 7/70; A47C 7/72; F16M 11/10
USPC ........ 248/917, 918, 919, 447.1, 292.12, 118, 248/125.2; 297/115, 173, 188, 423
See application file for complete search history.

(56) References Cited

U.S. PATENT DOCUMENTS

| | | | | |
|---|---|---|---|---|
| 4,779,922 A | * | 10/1988 | Cooper | .................. A47B 21/03 |
| | | | | 248/918 |
| 4,915,450 A | * | 4/1990 | Cooper | .................. F16M 11/10 |
| | | | | 248/919 |

(Continued)

*Primary Examiner* — Tan Le
(74) *Attorney, Agent, or Firm* — Avery N. Goldstein; Blue Filament Law PLLC

(57) ABSTRACT

The mobile structure for working with computer equipment or electronic devices, couplable to slanting chairs or armchairs that the invention proposes is therefore configured as a novelty within its field of application, because, when it is implemented, the said objectives are satisfactorily achieved, the characterizing details making it possible are suitably appearing in the final claims attached to this specification. Concretely, what the invention proposes, as it has been stated before, is a structure which aim is to allow the incorporation of computer equipment or electronic devices so that it is possible to work with them, or use them for leisure purpose, in a slanting chair or armchair and to be able to angularly move it, according to the tilt of the chair, at least in an upright position and a slanted position, being formed for it, by a mobile arm with a moving mechanism that is coupled to any slanting chair or armchair and that is provided with supporting means as a kind of desk to incorporate the computer equipment.

8 Claims, 2 Drawing Sheets

(51) Int. Cl.
*F16M 11/10* (2006.01)
*A47C 7/72* (2006.01)
*A47B 21/03* (2006.01)

(56) References Cited

U.S. PATENT DOCUMENTS

| | | | | |
|---|---|---|---|---|
| 5,452,950 A * | 9/1995 | Crenshaw | ............... | A47B 39/00 248/918 |
| 5,612,718 A * | 3/1997 | Bryan | ....................... | A47C 7/70 297/115 |
| 6,158,359 A * | 12/2000 | Allan | .................. | A47B 21/0314 108/1 |
| 8,939,500 B2 * | 1/2015 | Voigt | ..................... | A47B 83/02 297/173 |

* cited by examiner

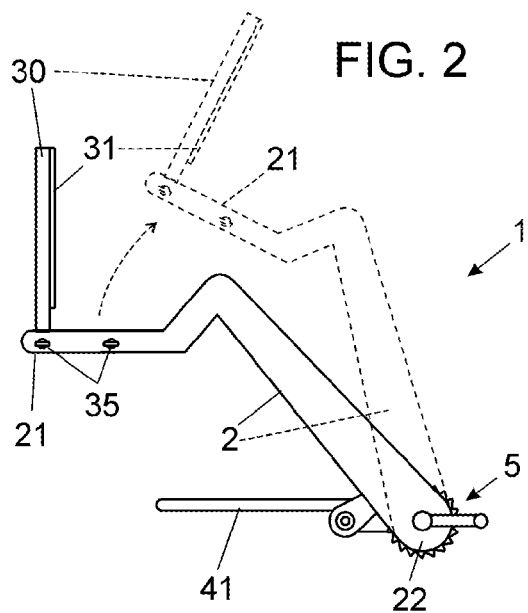
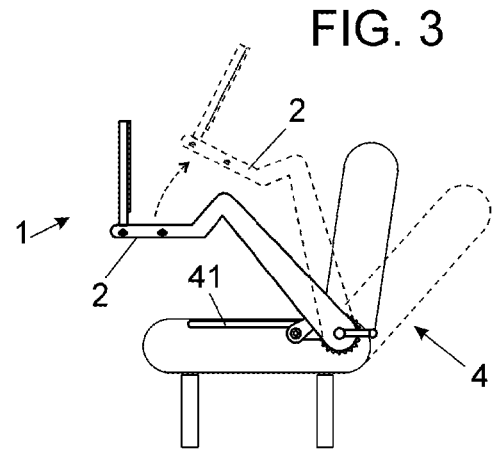
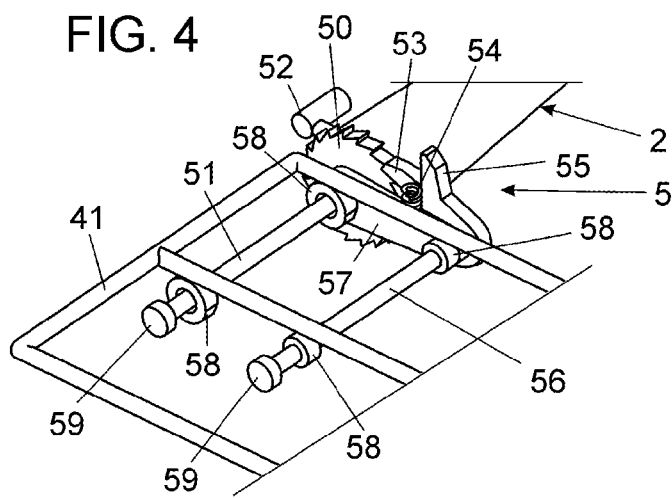

US 10,441,072 B2

MOBILE STRUCTURE FOR WORKING WITH COMPUTER EQUIPMENT COUPLABLE TO SLANTING CHAIRS

OBJECT OF THE INVENTION

The invention, as stated in the title of this specification, refers to a mobile structure for working with computer equipment couplable to slanting chairs or armchairs that provides to the function to which it is designed with advantages and characteristics of novelty that will be described in detail below.

The object of this invention concerns a supporting structure to incorporate computer equipment, usually formed by a screen, keyboard and mouse (that can be any working electronic device, touch screen, tablet, etc.) that is specially designed to be coupled to a slanting chair or armchair and to be able to move it angularly, according to the tilt adopted by the chair and working in a slanted position, for which, it comprises a mobile arm with supporting means, that act as a desk to incorporate the different elements of the computer equipment and that is sideways coupled to a slanting chair or armchair through a mechanism the operation of which allows to adapt its tilt with respect to the chair in, at least, two positions which are the main positions.

FIELD OF APPLICATION OF THE INVENTION

The field of application of this invention is within the sector of the industry engaged in manufacturing furniture, focusing namely in the field of the supporting structures and desks for computer equipment or personal computers and other electronic devices, encompassing at the same time the field of slanting chairs and armchairs.

BACKGROUND OF THE INVENTION

In the market, slanting chairs and armchairs are well-known, that through different types of mechanisms, pass from a straight position to a slanted position or with the backrest fully down. These chairs and armchairs, in addition, can have footrests or not that, in turn, are also lifted when the backrest is slanted, as well as armrest or not.

Likewise, it is known that the time spent using computer equipment or any electronic devices of any type is every time more frequent and extended, as well for professional use as for leisure.

The objective of this invention is, therefore, to provide the market with a structure that allows to match both, that means, the use of the said computer equipment or electronic devices on slanting chairs or armchairs to be able to work with them, as well in upright position as in slanted position.

On the other hand, and as reference to the current state of the art, it shall be stated that the existence of no other mobile structure for working with computer equipment couplable to slanting chairs or an invention of similar application is known, showing technical, structural and constituent characteristics equal or similar to those that the structure herein claimed possesses.

EXPLANATION OF THE INVENTION

The mobile structure for working with computer equipment or electronic devices, couplable to slanting chairs or armchairs that the invention proposes is therefore configured as a novelty within its field of application, because, when it is implemented, the said objectives are satisfactorily achieved, the characterizing details making it possible are suitably appearing in the final claims attached to this specification.

Concretely, what the invention proposes, as it has been stated before, is a structure which aim is to allow the incorporation of computer equipment or electronic devices so that it is possible to work with them, or use them for leisure purpose, in a slanting chair or armchair and to be able to angularly move it, according to the tilt of the chair, at least in an upright position and a slanted position, being formed for it, by a mobile arm with a moving mechanism that is coupled to any slanting chair or armchair and that is provided with supporting means as a kind of desk to incorporate the computer equipment.

The said arm is couplable to any slanting chair or armchair, and the supporting means are adapted as a workstation for any computer equipment, being understood as such any technological-electronic device and their respective peripherals.

As for the mechanism allowing to move the arm to its different positions, it is, preferably, a pawl mechanism comprising, at least a gearwheel associated to a crank drive and to a locking finger that are associated to each rotatory shaft with bearings that are coupled to the chair. Optionally, the operation of the mechanism can be automatic and being linked to a small electric motor.

This mobile structure for working with a computer equipment couplable to slanting chairs consists, therefore, of an innovating structure having characteristics unknown up to now for the aim to which it is designed, reasons which jointly with its practical utility provide it with grounds sufficient to obtain the privilege of exclusivity applied for.

DESCRIPTION OF THE DRAWINGS

To complement the disclosure being carried out and in order to assist to best understanding the characteristics of the invention, attached to this specification, as an integral part thereof, there is a set of drawings in which for illustration and no limitation purpose the following has been represented:

FIG. 2.—It shows a view in side elevation of the structure of the invention, according to the same example as in FIG. 1, shown in at least two positions of use, upright and slanted;

FIG. 3.—It shows a view in elevation of the structure, according to the invention, similar to that shown in the preceding figure, including, in this case its coupling to a slanting chair, the positions relative to both elements can be seen; and FIG. 4.—It shows a view in perspective of a portion of the structure of the invention, the pawl mechanism and its coupling to the base of the chair can be seen in it.

PREFERRED EMBODIMENT OF THE INVENTION

Figure 1:
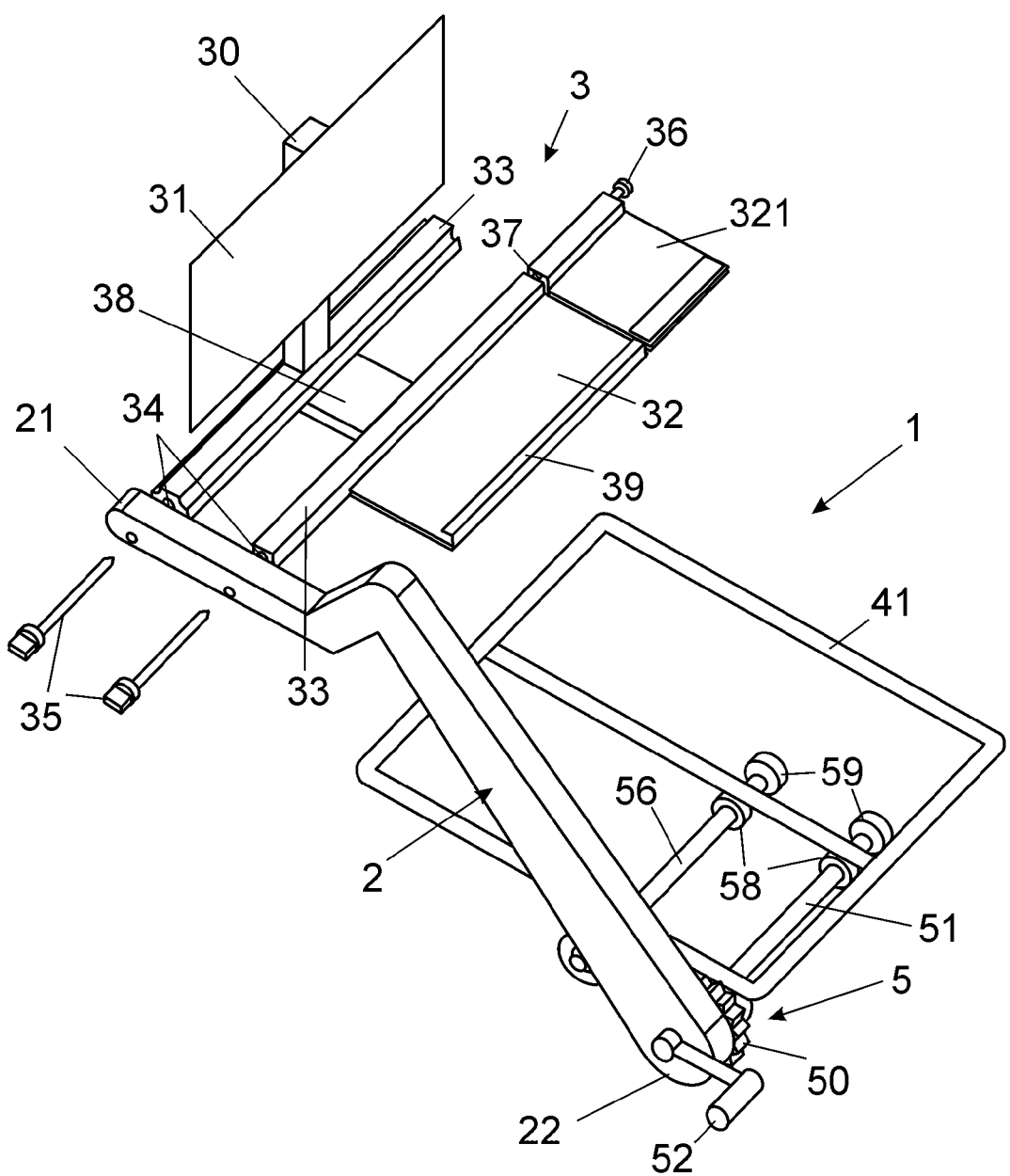
FIG. 1.—It shows a view in perspective of an example of the mobile structure for working with computer equipment or electronic devices, couplable to slanting chairs or armchair, object of the invention, which has been shown partly exploded, the main parts and elements it comprises can be seen as well as their configuration and arrangement.

At the sight of the said figures, and according to the numbering adopted in them, a no limiting example of the mobile structure for working or using for leisure purpose of computer equipment or electronic devices, couplable to slanting chairs or armchairs of the invention can be seen, which comprises the parts and elements stated and disclosed in detail thereafter:

Thus, as it can be seen in FIG. 1, the structure (1) involved essentially comprises, a mobile arm (2) that, at its distal end (21), incorporates the supporting means (3) to incorporate different elements of a computer equipment or electronic devices, so that they are suitably located for working with them or using them for leisure purpose, sitting on a slanting chair (or armchair) (4) which arm (2) is coupled by its opposite or proximal end (22), where a moving mechanism (5) is incorporated, the operation of which determines the rotation of the said arm (2) jointly with the said supporting means (3) to change its tilt with respect to the seat of the chair (4) at least to two positions of use, and being able to place it in concordance with the slanting position of the chair (4), as shown in FIGS. 2 and 3.

Preferably, the mechanism (5) for moving the arm (2) is a pawl mechanism comprising, at least, a gearwheel (50) which is linked to the proximal end (21) of the arm (2) and to a first rotation shaft (51) to which is also jointly linked a crank (52), a locking finger (53) also existing that locks the position of the arm (2) as it is interlocked in the said gearwheel (50).

In addition, that finger (53), is associated to a spring (54) that is prone to pull it to keep it interlocked in the gearwheel (50) and it shows a protrusion (55) that allows to pull the finger (53) in an opposite direction to be able to release it from the interlocking and move the arm (2) by means of the crank (52).

In addition, the finger (53) is associated to a second rotation shaft (56), that is parallel to the first shaft (51) of the gearwheel (50), both shafts (51, 56) being joined to each other by means of an intermediate part (57), as well as provided with several bearings (58) inserted therein so that the said bearings form part of the seat frame (41) of the chair or armchair (4) to which the structure (1) of the invention is coupled, when the said shafts rotate. The way of joining the moving system to the structure of the chair, can optionally be otherwise.

Preferably, both rotation shafts (51, 56) having the said bearings (58) possess end stops (59) to prevent them from coming out of their position, and they can consist of worms or any other passing closure.

With this, the operation of the crank (52) gives rise to the rotation of the gearwheel (50) tilting the arm (2) at the same time, setting the different positions through the finger (53) interlocking in the said wheel. Logically, the tilt of the arm (2) determines, at same time the tilt of the supporting means (3) where the computer equipment is usually incorporated.

Optionally, instead of the crank (52) the incorporation of a motor linked to the shaft (51) is provided to operate the rotation of the mechanism.

On its hand, as it is shown in FIG. 1, the supporting means (3) of the computer equipment or electronic devices, incorporated at the distal end (21) of the arm (2) preferably comprise a column (30) to which a grip (31) would be attached for screens, viewfinders or imaging devices, and a main base (32), perpendicular to the said grip for screens (31), the function of which would be as surface for keyboards or similar peripheral input devices, column (30) and the main base (32) joined to the respective parallel bars (33) that are provided with end holes (34) in which the pins (35) are screwed, that are inserted in them crossing the straight length of the distal end (21) of the arm (2), to achieve their anchorage to the arm (2).

Also, preferably, the bar (33) in which the main base (32) is incorporated includes an additional base (32) as surface for the due mouse or other peripheral, that can be fixed with variable tilt by means of a worm (36) that is inserted at the end opposite to the bar (33), part of the bar (33) joined to the support (32), in a rotating stem (37) so that when loosening such worm (36) it allows to calibrate the tilt of this additional base (321) for the mouse and adjust it as the user wishes.

In addition, both bars (33) are joined to each other by means of a joining part or plate (38) that strengthens the assembly.

Last, it shall be pointed out that at least the main base (32) and, optionally, also the additional base (321) possess a flange (39) at their external edge, the opposite to that joining them to the bar (33), to prevent that the keyboard and the mouse slide and fall down when the arm (2) is in tilted position.

As it can be seen in the figures, in the preferred embodiment, the arm (2) is constituted by an angulated part that shows at its distal end (21) at least a straight length that, when the arm (2) is in a first low of working position or of leisure in horizontal base such length remains in horizontal position, parallel to the floor, being in correspondence with the supporting means (3) for the computer equipment or other electronic devices, so that the column (30) and grip for the screens (31) remain in vertical position and the main base (32) for the keyboard in horizontal position while, when rotating the arm (2), by means of the moving mechanism (5), such straight length of the distal end (21) with supporting means (3) remains in a higher and tilted position and tilted with respect to the floor and the frame (41) of the seat of the chair (4) able to be slanted, as it can be seen in FIGS. 2 and 3.

The nature of this invention being sufficiently disclosed, as well as the way of implementing it, it is not deemed necessary to extend it any longer in order that a person skilled in the art understands its extent and the advantages derived from it, and it is stated that, within its essentiality, it can be embodied in other ways differing in details from that mentioned for example purpose and to which the scope of the protection shall extend provided that its main principle is not altered, changed or modified.

The invention claimed is:

1. A mobile structure for working or using computer equipment or other electronic devices couplable to slanting chairs or armchairs, the mobile structure comprising:
   a mobile arm (2) having a distal end (21) and a proximal end (22), the proximal end (22) being coupled to a slanting chair or armchair (4);
   a support (3) attached to the distal end (21) of said mobile arm (2), said support (3) configured to incorporate different elements of a computer or electronic equipment; and
   a moving mechanism (5) attached to the proximal end (22) of the mobile arm (2), wherein said moving mechanism (5) is a pawl mechanism comprising a gearwheel (50) and a locking finger (53), the pawl mechanism operated by hand by a crank (52), a spring (54) associated with said locking finger (53) to keep said locking finger (53) interlocking with said gearwheel (50) and wherein operation of said moving mechanism (5) rotatably moves said mobile arm (2) jointly with said support (3) to change the position of said mobile arm (2) with respect to a seat of the chair (4) between at least two positions of use in accordance with an upright position of the chair (4) and a slanted position of the chair (4).

2. The mobile structure for working or using computer equipment or other electronic devices couplable to slanting chairs or armchairs according to claim 1, wherein the gearwheel (50) is linked to the proximal end (21) of said mobile arm (2) and with a first rotation shaft (51) to which, in turn, the crank (52) is also jointly linked, and said locking finger (53) locks the position of said mobile arm (2) when it is interlocked in the gearwheel (50).

3. The mobile structure for working or using computer equipment or other electronic devices couplable to slanting chairs or armchairs, according to claim 2, wherein said locking finger (53) has a protrusion (55) to be able to release it from its interlocking.

4. The mobile structure for working or using computer equipment or other electronic devices couplable to slanting chairs or armchairs, according to claim 2, wherein said locking finger (53) is associated to a second rotation shaft (56) both shafts (51, 56) being provided with bearings (58) inserted in them so that the bearings are in the structure of the frame (41) of the seat of the chair or armchair (4) to which the structure (1) is coupled.

5. The mobile structure for working or using computer equipment or other electronic devices couplable to slanting chairs or armchairs, according to claim 4, wherein both rotation shafts (51, 56) with bearings (58) show final stops (59) to prevent them from coming out of their position.

6. The mobile structure for working or using computer equipment or other electronic devices couplable to slanting chairs or armchairs, according to claim 1, wherein said support (3) further comprises a column (30) with a grip (31) preferably flat for coupling screens, viewfinders or imaging devices, and a main base (32), perpendicular to the said grip for screens (31), having a likewise flat surface for keyboards and other similar input peripherals.

7. The mobile structure for working or using computer equipment or other electronic devices couplable to slanting chairs or armchairs, according to claim 6, wherein the column (30) and the main base (32) are joined to parallel respective bars (33) that are provided with end holes (34) in which worms (35) are screwed that are inserted in them crossing a straight length of the distal end (21) of said mobile arm (2), to achieve the anchorage of said mobile arm (2).

8. The mobile structure for working or using computer equipment or other electronic devices couplable to slanting chairs or armchairs, according to claim 6, wherein adjacent to the main base (32) there is an additional base (321) as surface for a mouse, such base (321) can be fixed with a variable tilt, by means of a worm (36), arranged on the end of one of the parallel bars (33).

* * * * *